UNITED STATES PATENT OFFICE.

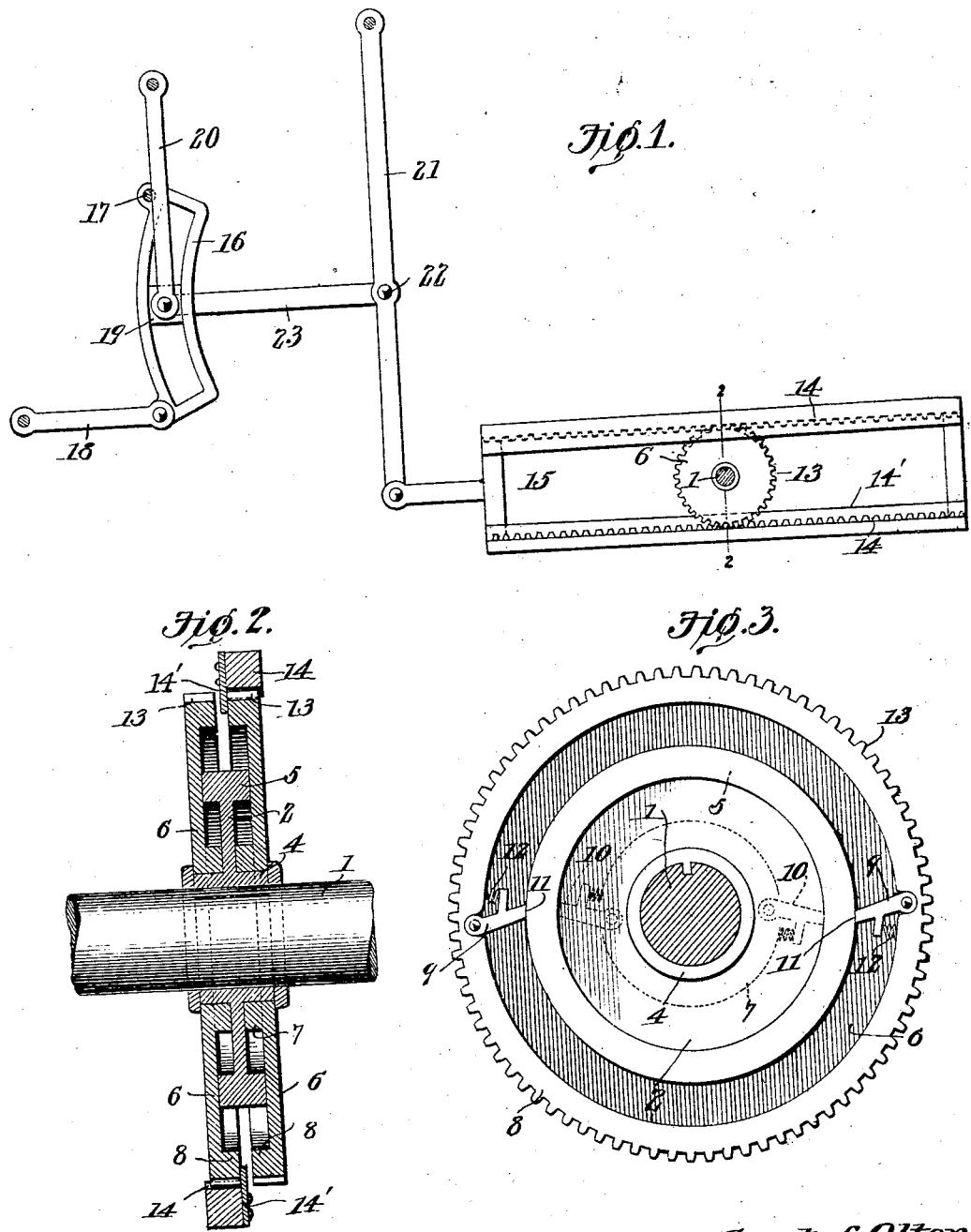

GUSTAF OLTON, OF MONTICELLO, MINNESOTA.

POWER-TRANSMITTING MECHANISM.

No. 860,881.

Specification of Letters Patent.

Patented July 23, 1907.

Application filed June 9, 1906. Serial No. 321,060.

*To all whom it may concern:*

Be it known that I, GUSTAF OLTON, a citizen of the United States, residing at Monticello, in the county of Wright and State of Minnesota, have invented a new and useful Power-Transmitting Mechanism, of which the following is a specification.

This invention relates to a mechanism for transmitting power from a driving element having either rotary or reciprocatory motion, to a rotary driven element at any desired speed from zero to maximum. Mechanisms of this character are of especial utility in connection with automobiles where an engine, such as a gasolene motor, may be run continuously in one direction and at constant speed, and various speeds, may be effected by suitable means intermediate the engine and the driving shaft of the vehicle. This means for changing the speed and direction of travel is of such a character that changes can be effected uniformly from one extreme to the other, and any suitable slow speed may be employed when traveling up a steep hill, while at the same time utilizing the full speed and hence the entire power of the motor.

With these ends in view, the invention comprises the novel features of construction and arrangement of parts, which will be fully described hereinafter in connection with the accompanying drawing, and set forth with particularity in the claims appended hereto.

In the accompanying drawing, which illustrates one of the embodiments of the invention, Figure 1 is a view of the power transmitting mechanism showing the same in side elevation. Fig. 2 is a section on line 2—2 of Fig. 1 drawn on an enlarged scale. Fig. 3 is a side elevation of the clutch mechanism for driving the rotary driven member, one of the parts being removed to show the interior.

Corresponding parts in the several figures are indicated throughout by similar characters of reference.

Referring to the drawings, and more particularly to Figs. 2 and 3, 1 represents a driven shaft which is adapted to be suitably connected to the driving shaft or rear wheels of a motor vehicle. On the shaft is keyed a disk 2 having extending from opposite sides central annular flanges 4 and peripheral flanges 5. Arranged on opposite sides of the disk 2 are clutch members or end plates 6 that are provided with central openings for fitting around the flanges 4, the latter forming a hub on the central disk 2. Each disk is provided with a central and peripheral flange extending axially in the same direction as indicated at 7 and 8, respectively.
These flanges form an annular space in which the peripheral flanges 5 of the central disk are disposed concentrically and midway between the flanges 7 and 8. Each of the members of the clutch is provided with sets of dogs arranged at diametrically opposite points and disposed with a dog of each set at the outside of the flange 5 of the center disk and the other dog on the inside of said flange, as indicated at 9 and 10. The dogs 9 are pivoted in recesses in the flange 8 and the dogs 10 are pivoted in the recesses in the flange 7 of each member of the clutch, and they are so disposed that the nose 11 of both dogs of each set will engage the interior and exterior surfaces of the flange 5 under the action of the springs 12 when each member is separately rotated in a particular direction. The dogs of one clutch member are arranged in a corresponding manner with those of the other member. By this arrangement, when one member is rotated, the other will be momentarily idle, and vice versa. This permits of motion being imparted to the shaft 1 by a reciprocating member which, when moving in one direction, will rotate one member of the clutch and when moving in the opposite direction will rotate the other member in the same direction.

In order to rotate the members of the clutch in this manner, each is provided with external gear teeth 13 that mesh each with a rack 14 provided on a rectangular frame 15, Fig. 1. The gears are permanently in mesh so that when the frame is moved in one direction, both gears will be rotated together, but in opposite directions, so that only one of the gears or clutch members will be rotating the driven shaft 1, the other member being idle during this particular stroke of the frame 15. On the return stroke, the previously idle member of the clutch will cause its dogs to grip the central member 2 and continue to rotate the shaft in the same direction, while the other member rotates idly. Thus it will be seen, continued reciprocation of the rack carrying frame 15 will uniformly drive the shaft 1. Strips 14' hold the racks and gears in place.

To drive the vehicle at different speeds, a change speed device is employed between the engine and rack carrying frame 15. This device comprises an arc-shaped slotted link or yoke 16 that is adapted to be pivoted at 17 to a suitable part of the vehicle frame. The lower end of the link is connected with the engine, (not shown) by the pitman 18 whereby the link 16 is rocked back and forth continuously on its pivot. Mounted in the slot of the base 16 is a slide block 19 that is capable of being adjusted from end to end of the link by a shift rod 20 that is suitably mounted on the vehicle, so as to be actuated from the driver's seat. Between the sliding block 19 and the frame 15 is a lever 21 adapted to be pivoted at its upper end to the vehicle frame, and connected at its opposite end to the rack carrying frame 15. Intermediate the ends of the lever 21 at 22 is connected a pitman 23 that is attached to the adjustable block 19. When the block 19 is at the upper end of the link 16, no substantial motion is transmitted from the engine to the driven shaft 1. By gradually shifting the block toward the lower end of the link, motion is transmitted uniformly from zero to maximum.

In a power transmitting device of the character described, the speed can be changed gradually from point to point within the limits of the device, so that the travel of the vehicle is much smoother than is possible where change speed gears are employed. Furthermore, in automobile systems employing change speed gears according to the usual practice, it is difficult at times to climb steep grades on account of not having a gear low enough. With the present construction, however, any desired low speed can be obtained while using the full speed and power of the engine.

While I have described the invention in connection with motor vehicles, it is obvious that it is not limited to this use, but may be employed in other instances where variable or intermittent motion is desired to be transmitted from a continuously operating motor or source of power. The power transmitting mechanism may also be found useful in mountain locomotives for enabling the latter to carry heavy loads on steep grades by reason of the low speed capable, and at the same time permitting a high rate of speed when traveling on the level.

I have described the principle of operation of the invention, together with the apparatus which I now consider to be the best embodiment thereof, but I desire to have it understood that the apparatus shown is merely illustrative, and that minor changes and modifications may be resorted to without departing from the spirit of the invention.

What is claimed is:—

1. In a power transmitting mechanism, the combination of a driven element, a disk having a peripheral flange extending from opposite sides thereof, members on opposite sides of the disk each having spaced concentric flanges arranged interior and exterior to the flange of the disk, sets of dogs between the flanges of the members and disk, one set of dogs engaging the external surface of the flange on one side of the disk and the other set engaging the internal surface of the flange on the opposite side of the disk, there being gears on the members, a longitudinal rack carrying frame for simultaneously rotating the members in opposite directions, and means for reciprocating the frame.

2. In a power transmitting mechanism, the combination of a driven element, a disk having a peripheral and a hub flange both extending from opposite sides thereof, a member on each side of the disk having spaced concentric flanges disposed interior and exterior of the peripheral flange of the disk and having a central opening for assembling on the hub flange of the latter, dogs carried by the flanges of the members for engaging on opposite sides of the peripheral flange of the disk, there being external gear teeth on the members, a rack engaging the teeth of each member, a reciprocating frame for supporting the racks, and a variable speed device for reciprocating the frame.

3. In a power transmitting mechanism, the combination of a driven shaft, a disk keyed thereto, gears rotatably mounted on opposite sides of the disk and slightly spaced apart, clutching devices on the gears arranged to grip the disk, a reciprocating frame including a rack meshing with each gear, means secured to each rack and engaging between the gears for preventing the racks from moving laterally off the gears, and a change speed mechanism for reciprocating the rack carrying frame.

In testimony that I claim the foregoing as my own, I have hereto affixed my signature in the presence of two witnesses.

GUSTAF OLTON.

Witnesses:
CHRISTINA CLAUSEN,
ALMA E. OLSON.